United States Patent [19]

Budraitis et al.

[11] 4,309,907
[45] Jan. 12, 1982

[54] LOAD MONITOR WITH SELECTIVE SENSOR CONNECTION

[75] Inventors: Tadas Budraitis, Midlothian; Gerald W. Seliga, Frankfort, both of Ill.

[73] Assignee: Productronix, Inc., Oak Forest, Ill.

[21] Appl. No.: 121,811

[22] Filed: Feb. 14, 1980

[51] Int. Cl.³ .......................... G01B 7/18; G01L 5/16
[52] U.S. Cl. ...................................... 73/771; 73/772; 73/862.04
[58] Field of Search ................. 73/763, 767, 771, 769, 73/770, 772, 773, 65, 862.04

[56] References Cited

U.S. PATENT DOCUMENTS 2,015,838 10/1935 Borden et al. ...................... 73/341
2,924,968 2/1960 Colten et al. ...................... 73/771 X Primary Examiner—Charles A. Ruehl
Attorney, Agent, or Firm—Wegner, Stellman, McCord, Wood & Dalton

[57] ABSTRACT

A load monitor for a reciprocating machine having a selective sensor connection for monitoring the total load or the individual load on each machine support member. A sensor is mounted on each one of a plurality of support members. The sensors are connected in series and to an outlet through which a portable detector may be connected. A multi-position switch selectively connects the sensors to the outlet so that the total load or the individual load on each support member may be monitored.

6 Claims, 3 Drawing Figures

LOAD MONITOR WITH SELECTIVE SENSOR CONNECTION

This invention relates to a load monitor for a reciprocating machine having two or more support members. The load monitor has a selective sensor connection so that the individual load on each support member or the total load may be monitored.

Prior load monitors for machines having two or more support members typically measure the individual loads on each support member but are not capable of monitoring the total load. Other load monitors measure the total load but not individual loads on the support members.

It is therefore a principal feature of this invention to provide a simple and inexpensive load monitor having a sensor mounted on each support member for a reciprocating machine and a sensor connection to selectively connect the sensor individually or in a series combination to an outlet. The load monitor is thus capable of selectively monitoring both the total load and individual loads on each support.

For a machine having two support members a three position switch selectively shorts out the unwanted sensor signals to monitor the load on a single support. An open circuit position allows the total load to be monitored.

A multi-section selector switch is utilized for a machine having more than two support members. The switch has two rotors wherein the first rotor selectively connects the sensors to the outlet and the second rotor shorts the unwanted sensor signals.

A portable detector connects to the outlet, providing a visual indication of the load monitored. The detector may be used in conjunction with a number of machines utilizing the selective load monitor of the present invention.

Further advantages of the invention will readily be apparent from the following specifications and from the drawings, in which.

Figure 1:
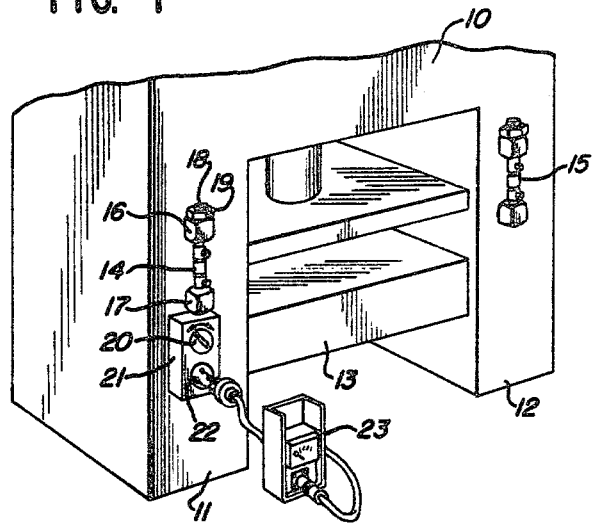
FIG. 1 is a fragmentary perspective of a machine having two support members for a reciprocating ram.
Figure 2:
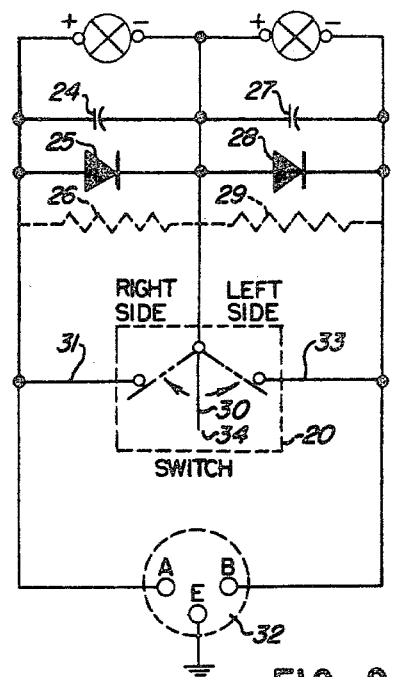
FIG. 2 is a circuit of the load monitor's selective sensor connection for the machine of FIG. 1.

FIGS. 1 and 2 illustrate a load monitor for a machine 10 having two support members 11 and 12 for a reciprocating ram 13. Sensors 14 and 15 are mounted on support members 11 and 12 respectively. The sensors are preferably piezo-electric transducers which generate a voltage signal proportional to the load on each of the individual support members. Sensor 14 is supported between brackets 16 and 17. A screw 18 is adjusted to preload the transducer after which a jam nut 18 is tightened. Sensor 15 is similarly mounted on support member 12. A switch 20 mounted on a box 21 selectively connects sensors 14 and 15 to an outlet socket 22 so that the individual loads on support members 11 and 12 or the total load may be monitored. A portable detector 23 plugs into socket 22 to provide a visual indication of the load monitored.

The selective load monitor circuit for a machine having two support members with two sensors 14 and 15 connected in series is shown in FIG. 2. A calibrating capacitor 24, a blocking diode 25 and a leakage adjusting resistor 26 are connected in parallel across sensor 14. Similarly calibrating capacitor 27, blocking diode 28 and leakage resistor 29 are connected in parallel across sensor 15. The leakage adjusting resistors 26 and 29 may be potentiometers having a nominal value of 1,000 M to provide uniform leakage of the sensor signal to ground. This value has been found to be appropriate for high speed machines.

The selector switch 20 is a single pole, three position switch connected between sensors 14 and 15. A switch member 30 selectively shorts unwanted sensor signals. A conductor 31 is connected between sensor 14 and terminal A of an outlet connection 32 and a conductor 33 is connected between sensor 15 and terminal B of the outlet connection. When the load on support member 11 is desired, switch 20 is positioned so that switch member 30 contacts conductor 33, shorting out the unwanted signal from sensor 15. Only the voltage signal generated by sensor 14 will be monitored. Similarly when the load on support member 12 is desired, switch 20 is positioned to connect switch member 30 to conductor 31 shorting out the unwanted signal from sensor 14 so that only the voltage signal generated by sensor 15 will be monitored. An open circuit position 34 is provided so that a voltage signal proportional to the total load and generated by the series combination of sensor 14 and 15 may be monitored.

The sensor signals are connected to the outlet connection 32 at terminals A and B having terminal E connected to ground. Outlet 32 provides the connection between the sensors 14 and 15 and the portable detector 23 to provide a visual indication of the monitored load as selected by switch 20.

Figure 3:
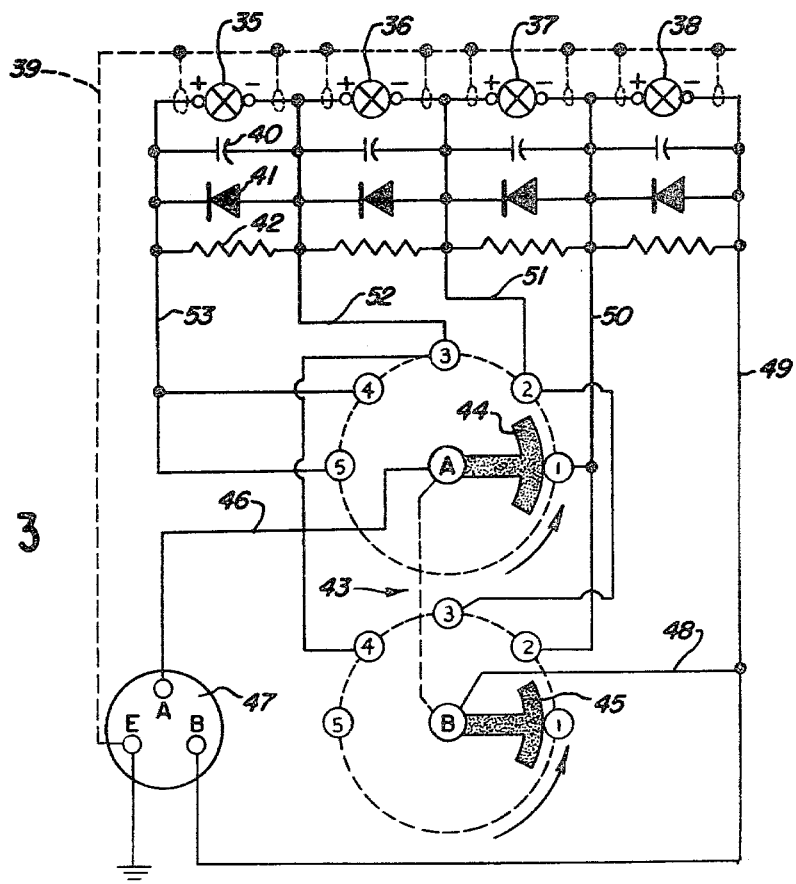
FIG. 3 is a circuit of the load monitor's selective sensor connection for a machine having four support members.

A load monitor circuit for a machine having four support members for a reciprocating ram is shown in FIG. 3. Each of the sensors 35, 36, 37 and 38 is mounted on a different one of the four support members and all four are connected in series. A sensor cable shield 39 isolates the sensor circuits from unwanted interference. Connected in parallel across each of the sensors 35-38 is a calibrating capacitor 40, a blocking diode 41 and a leakage adjusting resistor 42 similar to those shown in FIG. 2. A multi-section rotary selector switch 43 selectively connects the individual sensors 35-38 to an outlet connection so that the individual load on each support member or the total load may be monitored.

Switch 43 has two rotors A and B which are tied together and rotate counterclockwise through positions 1-5. Rotors A and B have make-before-break contacts 44 and 45 respectively. Contact 44 selectively connects the sensors through line 46 to terminal A of outlet 47. Contact 45 is connected to outlet connection 47 at terminal B by lines 48 and 49. Rotor B effectively shorts out the unwanted sensor signals as it rotates through positions 1-5.

The individual voltage signal generated by sensor 38 is monitored when switch 43 is in position 1 as shown. Contact 44 connects line 50 to outlet terminal A while contact 45 is in an open circuit position so that only sensor 38 is connected to the outlet connection 47. When switch 43 is rotated in a counterclockwise direction to position 2, contact 44 connects line 51 to outlet terminal A and contact 45 connects line 50 to outlet terminal B. Line 48 shorts the unwanted sensor signal 38 so that only the voltage from sensor 37 is monitored. The voltage signal from sensor 36 is monitored when switch 43 is in position 3. Rotor A connects line 52 through contact 44 to outlet terminal A and rotor B connects line 51 through contact 45 to outlet terminal B with line 48 shorting the unwanted signals from sensors 37 and 38. In the fourth position the voltage signal from sensor 35 is monitored by connecting line 53 through contact 44 to outlet terminal A and line 52 through contact 45 to outlet terminal B while line 48 effectively shorts the unwanted signals from sensors 36, 37 and 38. A voltage signal proportional to the total load and, generated by the series combination of sensors 35, 36, 37 and 38 is monitored when switch 43 is in position 5. Contact 44 connects line 53 to outlet terminal A while contact 45 is in an open circuit switch position so that all of the sensors are connected in series across the outlet connection 47.

I claim:

1. A load monitor for a reciprocating machine having a plurality of support members, comprising:
    a plurality of sensors, one mounted on each of different support members;
    a circuit connecting said sensors in series;
    an electrical connector on said machine for connection with a portable load indicator; and
    a multi-position switch at said machine connected between said sensor circuit and said electrical connector, said switch having positions to connect each sensor individually with said connector, and a position to connect the series combination of said sensors with said connector.

2. The load monitor of claim 1 wherein the multi-position switch has contacts which short circuit those sensors not connected with the load indicator connection.

3. The load monitor of claim 1 for a reciprocating ram having two support members and first and second series connected sensors wherein the sensor circuit includes:
    a first conductor connected between the first sensor and the load indicator connection;
    a second conductor connected between the second sensor and the load indicator connection; and
    a third conductor connected between the first and second series connected sensors and the multi-position switch.

4. The load monitor of claim 3 wherein the multi-position switch is a single pole, three position switch having a switch member connected to said third conductor and operable to connect the third conductor to the first conductor to monitor the second sensor, to the second conductor to monitor the first sensor or to an open circuit position to monitor both sensors.

5. The load monitor of claim 1 for a reciprocating ram having more than two support members wherein the multi-position switch is a multi-deck rotary switch having a first rotor and a second rotor tied together, the first rotor having a plurality of positions for selectively connecting the sensors to the load indicator connection, and the second rotor having a plurality of positions for selectively short circuiting one or more but not all of the sensors connected by the first rotor to the load indicator connection and having at least one open circuit position.

6. The load monitor of claim 5 wherein the sensor circuit includes a plurality of conductors between each adjacent pair of the series connected sensors for connecting the sensors to various positions of the first and second rotor of the multi-position switch;
    a first connection between the first rotor and the load indicator connection; and
    a second connection from the second rotor and between the first sensor of the series and the load indicator connection.

* * * * *